United States Patent
Voit et al.

(10) Patent No.: US 8,361,217 B2
(45) Date of Patent: Jan. 29, 2013

(54) METALLIC PAINT, METHOD FOR THE PRODUCTION THEREOF, AND USES THEREOF

(75) Inventors: Thomas Voit, Auerbach (DE); Christian Schramm, Hersbruck (DE)

(73) Assignee: Eckart GmbH (DE)

( * ) Notice: Subject to any disclaimer, the term of this patent is extended or adjusted under 35 U.S.C. 154(b) by 511 days.

(21) Appl. No.: 12/522,829

(22) PCT Filed: Jul. 18, 2008

(86) PCT No.: PCT/EP2008/005901
§ 371 (c)(1),
(2), (4) Date: Nov. 20, 2009

(87) PCT Pub. No.: WO2009/015788
PCT Pub. Date: Feb. 5, 2009

(65) Prior Publication Data
US 2010/0064938 A1  Mar. 18, 2010

(30) Foreign Application Priority Data

Jul. 31, 2007 (DE) .......................... 10 2007 036 369

(51) Int. Cl.
*C09B 1/62* (2006.01)
*C04B 41/50* (2006.01)

(52) U.S. Cl. ..................................... 106/404; 106/287.1
(58) Field of Classification Search ............... 106/287.1, 106/404, 426, 442; 524/441; 427/388.1
See application file for complete search history.

(56) References Cited

U.S. PATENT DOCUMENTS

| | | | |
|---|---|---|---|
| 5,028,639 | A | 7/1991 | Treutlein et al. |
| 5,868,819 | A | 2/1999 | Guhde et al. |
| 7,109,262 | B2 | 9/2006 | Sapper |
| 7,109,263 | B2 | 9/2006 | Paul et al. |
| 7,172,812 | B2 | 2/2007 | Greiwe et al. |
| 2005/0004265 | A1 | 1/2005 | Sapper |
| 2007/0199478 | A1 | 8/2007 | Schlegl et al. |
| 2008/0087187 | A1 | 4/2008 | Maul et al. |
| 2009/0029173 | A1 | 1/2009 | Schramm et al. |
| 2009/0264575 | A1 * | 10/2009 | Henglein et al. .............. 524/441 |

FOREIGN PATENT DOCUMENTS

| | | | |
|---|---|---|---|
| DE | 263 07 31 | B2 | 11/1978 |
| DE | 198 20 112 | A1 | 11/1999 |
| DE | 697 06 471 | T2 | 4/2002 |
| DE | 100 39 404 | A1 | 7/2002 |
| DE | 10 100 195 | A1 | 8/2002 |
| DE | 101 54 030 | A1 | 5/2003 |
| DE | 101 540 30 | A1 | 5/2003 |
| DE | 696 25 797 | T2 | 10/2003 |
| DE | 103 15 775 | A1 | 10/2004 |
| DE | 10 2005 026523 | A1 | 12/2006 |
| DE | 20 2006016073 | U1 | 2/2007 |
| EP | 0 259 592 | B1 | 11/1990 |
| EP | 0 451 785 | B1 | 6/1995 |
| EP | 0 806 462 | B1 | 1/2003 |
| GB | 802 342 | | 10/1958 |
| GB | 1555883 | | 11/1979 |
| JP | 2007-169378 | | 7/2007 |
| WO | WO 01/81483 | | 11/2001 |
| WO | WO 2005/063897 | * | 7/2005 |
| WO | WO 2005/118722 | | 12/2005 |
| WO | WO 2006/110331 | A1 | 10/2006 |

OTHER PUBLICATIONS

International Search Report dated Feb. 4, 2009, issued in corresponding international application No. PCT/EP2008/005901.
German Office Action dated Apr. 1, 2008, issued in corresponding priority German application No. DE 10 2007 036 369.0.

* cited by examiner

*Primary Examiner* — Anthony J Green
*Assistant Examiner* — Pegah Parvini
(74) *Attorney, Agent, or Firm* — Ostrolenk Faber LLP

(57) ABSTRACT

The invention relates to metallic paint comprising water and/or organic solvent and also at least one film-forming agent, at least one organofunctional silane, and at least one metallic effect pigment, the metallic effect pigment being a leafing aluminum pigment.
The invention also relates to a process for preparing the metallic paint of the invention, and its use. Also, furthermore, an article painted with the metallic paint of the invention, and a vehicle finish.

33 Claims, No Drawings

METALLIC PAINT, METHOD FOR THE PRODUCTION THEREOF, AND USES THEREOF

CROSS REFERENCE TO RELATED APPLICATIONS

The present application is a 35 U.S.C. §371 National Phase conversion of PCT/EP2008/005901, filed Jul. 18, 2008, which claims benefit of German Application No. 10 2007 036 369.0, filed Jul. 31, 2007, the disclosure of which is incorporated herein by reference. The PCT International Application was published in the German language.

TECHNICAL FIELD

The invention relates to a metallic paint which comprises water and/or organic solvent and also at least one film-forming agent comprising organo-functional silanes and at least one leafing metallic effect pigment. The invention further relates to a process for preparing this metallic paint, and also to its use, and also to an article painted with this metallic paint, and a rim finish.

BACKGROUND OF THE INVENTION

Workpieces, such as vehicle parts, for example, are provided for purposes of optics, decoration, and inhibition of corrosion and wear, with a coating.

Conventional coating methods are chroming, vaporizing or painting.

In the case of chroming, especially bright-chroming, materials of iron, copper, copper-zinc, copper-tin, and aluminum are conventionally used. However, the workpiece surface to be chromed often requires manual or mechanical polishing.

The thermal vaporizing (vapor deposition, vapor coating) that is also used for the coating of metal surfaces is a high-vacuum-based coating technique that comes under the heading of the PVD processes. Typical materials for this operation are metals, such as aluminum, copper, silver, and gold, for example, but also other suitable materials. This known coating method, however, necessitates a relatively high level of technical complexity.

For vehicle finishing, especially rim finishing, metallic paints are used with particular advantage.

Paints, in accordance with DIN 971-1 (09/1996), are coating materials in liquid, paste or powder form which, when applied to a substrate, produce a covering coating which has protective, decorative or specific technical properties. The principal components of the paints are binders, solvents, pigments, fillers, and paint auxiliaries. These paints are subdivided according to various technical standpoints.

Metallic paints are effect paints having the typical characteristics of a metallic gloss, a high light/dark flop, and high brightness, and also high hiding power. Metallic finishes. They comprise platelet-shaped metallic pigments which, in application, adopt an orientation largely parallel to the substrate. In this way, by the action of numerous small mirrors, a directed reflection is produced that is responsible for the metallic gloss. However, there is also always a certain fraction of scattered radiation produced, which comes about as a result of incomplete plane-parallel orientation of the pigments and also as a result of roughnesses in the individual pigment particles, such as edges or uneven surfaces, for example. Metallic finishes are therefore characterized by this interplay of directed and diffusely scattered radiation, which produce the light/dark flop. Also, in the case of common metallic finishes, although it is no longer possible to discern individual pigment particles, it is nevertheless always possible to discern a particulate texture to the paint. This phenomenon is difficult to detect by colorimetry.

Commonly, therefore, the visual appearance of metallic paints pigmented with platelet-shaped metallic pigments is different from the aspect of pure metal surfaces, where there are virtually no scattering effects.

Metallic paints are also obtainable through use of expensive PVD metallic pigments.

The PVD pigments, whose preparation is relatively expensive, are nonleafing pigments, i.e., pigments which are completely wetted by the binder and which are distributed throughout the paint film, but not at the surface of the paint film. PVD pigment paints have a binder fraction of only up to about 10% by weight, based on the total weight of the paint, and so the optical paint properties of the pigment, such as gloss, for example, are manifested in full.

In order to obtain the desired finishing effects with a metallic paint comprising PVD metallic pigment, the substrates to be painted must be very smooth (even) and thoroughly pretreated. It is disadvantageous, furthermore, that a workpiece bearing abrasion scars cannot be painted with a metallic paint comprising PVD metallic pigment, since the abrasion scars are not hidden. In addition, it is not possible to eliminate finishing defects. Instead, in the case of a finishing defect, the PVD finish must be removed from the workpiece and the workpiece must be painted anew.

Furthermore, these known chrome effect paints comprising PVD pigments have a tendency, particularly in the case of a sprayed finish, to form "mottle", i.e., areas of shading which have different lightnesses and darknesses, in the paint surface, thereby adversely affecting the optical qualities of the paint surface. The mottling is the result of the nonuniform orientation of the conventional aluminum pigments, particularly through aluminum pigments which stand almost vertically in the finish.

These finishing defects are recorded in particular in the finishing of materials of large surface area, such as of bodywork parts, for example. Moreover, an optimum finish effect is dependent on the parameters of the particular mode of application (dry, wet).

A further disadvantage of PVD pigment paints is their problematic management in aqueous coating compositions. On account of their extremely high and smooth specific surface area, their tendency toward agglomeration is very high. Moreover, PVD pigment paints are relatively difficult to apply. Automobile finishes with a uniform appearance can be accomplished only by means of manual painting in thin coats in numerous painting steps. Such sensitive application behavior runs counter to the kind of automated painting which is usual, for example, for vehicle finishes.

Owing to high interface surface tension, leafing pigments are not wetted by the binder, and therefore float in the aqueous paint film and become oriented at the paint film surface. This effect is obtained, for example, through the use of stearic acid as a grinding assistant in the milling of particles of a metal shot, such as of an aluminum spray shot, for example. Platelet-shaped leafing pigments of this kind form a dense mirror at the paint surface, composed of metallic effect pigments oriented parallel to the paint surface. These metallic effect pigments, with a high metallic gloss, however, have only limited wipe resistance and scratch resistance, since the metallic effect pigments are inadequately fixed in the binder matrix. As a result of their floating behavior, therefore, leafing pigments produce a dense barrier layer at the paint surface.

Consequently, effective capacity for recoating, such as with a clearcoat, for example, is no longer possible. This barrier layer hinders or prevents reliable adhesion of the topcoat to the basecoat surface, and so, in the course of use of a painted article, there may be instances of detachment of the topcoat film and of damage to the coat containing metallic effect pigment. Moreover, the topcoat, a clearcoat, for example, adversely affects the optical properties of the metallic basecoat, especially its gloss, i.e., the gloss is reduced.

A further substantial disadvantage of conventional metallic finishes is their wipe resistance and scratch resistance, which are not adequate for every end use, and also their abrasion stability (DIN 55923), owing to the above-described inadequate fixing of the aluminum flakes in the binder matrix.

When aluminum effect pigments are used in environment-friendly aqueous paint systems, such as water-based paints, for example, there is the problem of preventing a chemical reaction of aluminum with water, to avoid unwanted evolution of hydrogen. The conventional hydrophobing of the aluminum surface that is employed in response to this problem, by means of grinding assistants, such as stearic acid, is not usually enough to prevent the reaction of the aluminum pigments with water and hence the loss of metallic gloss and adverse effect on storage stability, through agglomeration, for example. For aqueous paint systems, therefore, water-based paints, for example, aluminum effect pigments used are provided with an anticorrosion coating. The anticorrosion effect is produced, for example, by the application to the aluminum surface of corrosion inhibitors, organophosphorus compounds for example. Furthermore, the aluminum pigments may also be passivated, i.e., protected from corrosion, by what are called conversion coats, such as by chromating (EP 0 259 592 B1), for example. A third stabilization principle is based on the complete encapsulation of the aluminum effect pigment in a chemically inert, largely transparent coat, typically protective coats produced by sol/gel operations, such as an $SiO_2$ coating, for example.

For the pigmentation of high-gloss metallic paints it is advantageous to use thin, platelet-shaped, leafing aluminum effect pigments which are obtained by mill-shaping of aluminum shot, and which are also referred to as "silver dollars". These aluminum effect pigments—in comparison to the aluminum pigments from comminution milling that are referred to as "cornflakes"—have a relatively round form and a relatively smooth surface. The aluminum effect pigments that are also referred to as cornflakes differ from the aluminum effect pigments that are also referred to as silver dollars in that the surface is rougher and some of the edges have indentations.

WO 01/81483 relates to a pigment preparation and to an aqueous effect basecoat produced therefrom, with particularly good shearing stability, for vehicle finishes. The pigment preparation comprises at least one carboxyl-functional resin and water-miscible organic solvents, and also metal pigments coated with a silicon-oxygen matrix, examples being aluminum pigments such as commercially available "STAPA IL Hydrolan", a nonleafing aluminum effect pigment from Eckart. The paint compositions described therein correspond to a typical metallic paint, but without having the special features of a chrome-effect paint.

Furthermore, WO2006/110331A1 discloses a coating composition for corrosion control paints for metal, plastic, and other substrates. These compositions include metal pigment powders (in flake form and also as metal powders) having a grain size of 100-325 mesh. According to the U.S. Bureau of Standards, this relates to pigments having a $D_{100}$ of approximately 212 µm and a $D_{50}$ of approximately 62 µm.

DE 100 39 404 A1 relates to an organically modified, inorganic pigmented composition for corrosion control on metal surfaces. This composition, prepared by means of a sol-gel process on the basis of polysiloxanes, may also be pigmented with leafing metallic pigments that are prepared by conventional milling of circular aluminum grains in ball mills in the presence of "lubricants", such as stearic acid, for example, and have an average particle diameter of at least 0.5 µm.

Contrastingly DE 198 20 112 A1 discloses an effect pigment which is coated with at least one reactive surface modifier and is intended for preparing inks, printing-inks, paints, coatings, and plastics. These effect pigments, which have a particle size of 1 to 200 µm include aluminum effect pigments among others, are said not only to be readily wetted by the binder or solvent of the ink or paint but also to undergo effective orientation in the liquid paint film and, moreover, to enter with their surrounding binder matrix into an intimate bond, in order to enhance properties of the application medium, such as weathering stability, corrosion control, brilliance, and impact strength, for example.

Known from DE 263 07 31 B2 is the use of leaflet-shaped nonleafing and leafing aluminum pigments with a translucent polysiloxane coating in electrostatically sprayable wet paints. This wet paint, which can be applied exclusively by electrostatic means, is prepared by incorporating the silane compound, in solution in a solvent, into a paste of the metallic pigments, and at the same time initiating the hydrolysis in a known manner. The hydrolysis and/or crosslinking of the silanes is accomplished chemically or thermally.

DE 10100195 A1 relates to an aqueous effect coating material comprising effect pigments, binder, and a neutralizing mixture of at least two fatty acids. In this coating material, whose possible uses include motor vehicle finishing, the pigments that can be used include passivated silver dollar and cornflake aluminum effect pigments having a particle diameter which is characteristic of these pigment types.

WO 2005/118722, moreover, discloses an aqueous coating composition comprising at least one water-compatible film-forming agent and platelet-shaped aluminum pigments that have at least one inorganic corrosion control coat. The passivated aluminum effect pigments present in this coating composition, which can also be used for high-gloss automotive finishes, the pigments being prepared by mechanical shaping of spray shot, have an average thickness of at least 50 nm. In application, the coating composition described here does not have the gloss of a chrome-effect paint.

DE 697 06 471 T2 relates to a water-thinnable coating composition which can be applied by heat-curing to a substrate, including a metal substrate such as steel. This coating is used as a corrosion control coating and its components include a high-boiling organic liquid (boiling point above 100° C.), a particulate metal, such as aluminum flakes, for example, and a water-reducible epoxy-functional silane binder.

DE 20 2006 016 073 U1 discloses a chrome-effect paint and a chrome-effect finish for motor vehicles and motor-vehicle parts. This chrome-effect paint comprises a suspension of nonleafing aluminum pigments having an average particle size of less than or equal to 10 µm, and at least one organic solvent, such as butylglycol, for example. The claimed chrome-effect finish consists of at least one undercoat, an effect coat comprising the aluminum pigments, and also a clearcoat.

DE 101 54 030 A1 discloses an aqueous effect coating composition which is to be useful for applications including finishes on motor vehicle bodywork/parts. This known coating material comprises different binders, such as (meth)acrylate co(polymers) and polyurethanes, for example, effect pigments, and silicon compounds that take on the function of a stabilizer for the effect pigments and the function of the crosslinking agent. Effect pigments specified include a multiplicity of pigment types in different use forms, in the form of organic and inorganic coloring pigments, metal flake pigments, and nonmetallic effect pigments, for example. In the only example to illustrate the subject matter of the application, however, an aluminum effect pigment was named, but without further physical characterization.

DE 696 25 797 T2 discloses a curable resin composition for use in water-based coating materials. The coating materials produced using the new resin composition, and intended, among other applications, for use in the automotive segment, for example, are said to have substantially improved coating properties and curing properties, and also excellent resistance to weathering, solvents, chemicals, and water. This known coating material (resin composition) comprises at least one emulsion polymer (A) having tertiary amino groups and a compound (B) having at least one epoxy group and hydrolyzable silyl group, and may also comprise a further compound (C). In order to obtain a metallically lustrous surface, this coating material may also comprise an aluminum paste, of which no more detailed description is given.

DE 10 2005 026 523 A1 relates to a two-component anticorrosion paint comprising metal pigment, epoxy binder component, and aminic hardener, for producing corrosion control coatings. This known protective paint is composed of a component (A) having platelet-like metal pigments and at least one epoxysilane and/or epoxy silicone, and also an organic solvent, and a component (B) having at least one aminic hardener and platelet-like metal pigments and an organic solvent. In this known anticorrosion paint, platelet-like metallic pigments containing zinc and aluminum are used in different weight proportions and mixing ratios. With this paint, the optical-decorative properties are not of interest.

Finally, EP 0 451 785 B1 presents nonleafing aluminum pigments which are prepared by conventional wet milling and have a high reflectance and high opacity. The average particle diameter of the aluminum pigment, which is passivated by a covering film, is 5-25 μm.

OBJECTS OF THE INVENTION

It is an object of the present invention to provide a new metallic effect paint which is easy to prepare, stable on storage, and enables finishes which have a very high metallic gloss and, preferably, the appearance of a substantially unstructured, coherent liquid metal film, with low levels of pigmentation.

The intention is that it should be possible both to use the aqueous or solventborne metallic paint as a single-coat system and to recoat it—that is, it is to be capable of development to a two-coat or multicoat system. Furthermore, the new metallic paint ought to be able to be used with particular advantage in vehicle finishing, particularly in rim finishing, with the metallic paint preferably having high hiding power and abrasion-scar coverage, reduced susceptibility to soiling, high scratch and abrasion resistance, and/or high chemical resistance and weathering stability.

A further object of the invention is to provide a metallic paint which comprises inexpensive metallic effect pigments.

Furthermore, the new metallic paint ought to be easier to apply than a metallic paint comprising PVD pigments.

SUMMARY OF THE INVENTION

This object is achieved by the provision of a metallic paint which comprises water and/or organic solvent, at least one film-forming agent, at least one organofunctional silane, and at least one leafing metallic effect pigment, the metallic effect pigment being a leafing aluminum effect pigment.

The metallic paint of the invention is notable for a chrome effect and can therefore also be referred to as a metallic paint with chrome effect.

A "chrome-effect paint" is a paint which, in film-forming application, largely has the optical properties of a metallized, more particularly chromed, surface. By this is meant, in particular, an extremely high gloss and the appearance of a substantially unstructured, coherent liquid metal film. In the context of this invention a chrome-effect paint has a gloss value of more than 350 gloss units. This gloss value is a dimensionless index which can be determined using the micro-Tri-gloss μ instrument of Byk-Gardener at a measurement angle of 60° in accordance with the manufacturer's instructions.

DETAILED DESCRIPTION

In one preferred embodiment the metallic paint of the invention after application has gloss values of more than 350 units, more preferably of more than 400 units, more preferably still of more than 425 units, and hence has the properties of a chrome-effect paint. These gloss measurements are carried out using a micro-Tri-gloss μ instrument from Byk-Gardener at a measurement angle of 60° in accordance with the manufacturer's instructions.

The aluminum effect pigment for use in accordance with the invention preferably comprises platelet-shaped aluminum pigments obtained by mechanical shaping treatment, preferably by milling.

Preferred developments of the metallic paint of the invention with leafing aluminum effect pigments are specified in dependent claims 2 to 22.

The object on which the invention is based is additionally achieved by a process according to claim 23 for preparing the metallic paint of the invention, said process comprising the following step:

Combining leafing aluminum effect pigments, at least one organofunctional silane, and at least one film-forming binder.

In one preferred development of the invention, the viscosity that is required for application of the paint can be produced by adding organic solvent and/or water. Furthermore, with the process of the invention, it is preferred that, in the process of the invention, the leafing aluminum pigments in paste form are combined with the further components and also water and/or organic solvent, to provide the metallic paint.

In one development of the process of the invention the leafing aluminum effect pigments are prepared by mechanical milling and/or mechanical shaping of aluminum particles using at least one organic lubricant, preferably stearic acid.

The object on which the invention is based is additionally achieved through the use of the metallic paint of the invention according to any of claims 1 to 22, and by an article painted with the metallic paint of the invention, preferably vehicle rims, radiator grills, door handles, trim strips, bumpers, etc., and also a vehicle finish, preferably a rim finish.

The metallic paint of the invention, of any of claims 1 to 22, is used preferably in high-gloss coatings with a pronounced metallic effect, such as automobile paints, refinishes, industrial coatings, and coatings on metal, plastics, wood or glass.

To prepare the metallic paint of the invention it is advantageous to disperse a commercially traded leafing aluminum pigment paste from Eckart GmbH & Co. KG, D-91235 Velden, Germany, which comprises aluminum effect pigments obtained by ball milling in the presence of isopropanol and stearic acid, the dispersing taking place in commercial organic solvent, isopropanol for example, and mixing this pigment dispersion with at least one commercial organofunctional silane, an epoxysilane for example, and with at least one commercial film-forming binder, preferably comprising at least one resin component, to form a paint. The resulting paint can be diluted to the required application viscosity with organic solvent, such as butylglycol, and/or with water, and applied in a known way, by means of high-pressure spraying, for example, to a workpiece, such as to a vehicle component—a vehicle rim—for example, or to a nonmetallic surface such as plastic, wood or glass, for example.

Surprisingly it has emerged that metallic finishes with very high degrees of gloss and an unstructured appearance that mimics liquid metal can be obtained by providing a paint comprising leafing aluminum effect pigments with epoxysilane-containing binder.

Owing to their leafing properties, the aluminum effect pigments are localized primarily at or in the vicinity of the surface of the applied paint film, and exhibit a very good orientation, resulting in very high gloss of the paint, with preferably more than 350 gloss units.

Surprisingly, however, finishes of this kind can be recoated, which was not a possibility with leafing aluminum effect pigments in accordance with the prior art. Normally, leafing aluminum effect pigments are not abrasion-resistant, and represent such a barrier between basecoat and subsequent clearcoat that the adhesion between these coats is inadequate. Apparently the addition of epoxysilanes provides precisely this necessary adhesion, although at the present point in time the precise mechanism is unknown.

It is thought that the epoxysilanes are bound at least partly by hydrolysis and condensation processes to the surfaces of the metal pigments via Si—O—Al bonds. The epoxy radical is then available to the clearcoat system for crosslinking.

It has also emerged, surprisingly, that there are two kinds of aluminum effect pigments in particular that are especially suitable for achieving the stated objects.

Both pigments are prepared by conventional wet milling and therefore not by PVD methods.

In the X-ray diffractogram measuring using pigments in a substantially plane-parallel arrangement, these aluminum effect pigments exhibit one, two or more main peaks which do not correspond to the [111] reflections and/or [222] reflections.

The aluminum effect pigments used in the metallic paints of the invention therefore differ significantly in their X-ray diffractometric behavior from PVD pigments. In order to investigate samples of platelet-shaped aluminum pigments by means of X-ray diffractometry (XRD, X-ray Reflection Diffraction), the pigments are first oriented substantially plane-parallel to the sample substrate. A suitable instrument is in principle any commercially available X-ray diffractometer.

By substantially plane-parallel arrangement is meant, for the purposes of the invention, that at least 80% of the pigments are present within a tolerance range of +/−15° to the substrate parallel.

It is found that PVD pigments always have one main peak with the reflection of the [111] plane. By a [111] plane is meant the Miller indices. The [111] plane corresponds to the closest possible plane of a metal which crystallizes in face-centered cubic mode. This result is known per se, since it is known that, when aluminum is sputtered on to a foil, crystals of this kind are formed. Surprisingly, however, it is found that the aluminum pigments of the invention do not have a main peak at the reflection of the [111] plane. The reflection of the [111] plane, if present at all, is always weak. The main peak or, possibly, the main peaks correspond preferentially to the reflections of the and/or the [220] planes. With particular preference the main peak corresponds to the [200] plane.

In contrast to PVD pigments, the intensity ratio [111]/[200] in the case of the aluminum effect pigments of the metallic paint of the invention is always <1. Preferably this ratio is <0.5 and more preferably <0.1.

It is thought that these properties are a reflection of the plastic deformation state in which the aluminum pigments find themselves during the milling operation and/or thereafter. During the shape-imparting milling procedure, the at least polycrystalline aluminum shot is exposed to strong shearing forces. There is shearing of individual crystallites against one another, with the closest-packed [111] plane evidently being the shear plane. Since milling takes place naturally vertical to the platelet surface, these planes are broken away from the platelet plane, which is evident from the decreasing peak intensity in the diffractogram. At the same time, the peaks of the [200] and [220] planes become more intense.

In one preferred embodiment the pigments in question are preferably relatively coarse leafing aluminum effect pigments, preferably silver dollar pigments. These leafing aluminum effect pigments, preferably silver dollar pigments, are platelet-shaped aluminum effect pigments having a relatively smooth surface and round edges. They are obtained by wet milling, which essentially constitutes a shape-imparting milling operation of aluminum shot.

These leafing aluminum effect pigments, preferably silver dollar pigments, are preferably prepared by wet milling in alcoholic media such as isopropanol, ethanol or n-butanol, for example. Lubricants used are preferably long-chain saturated fatty acids such as stearic acid, palmitic acid or lauric acid, for example.

In a further preferred embodiment these leafing aluminum effect pigments, preferably silver dollar pigments, have particular size proportions. These proportions are represented by characteristic parameters of the cumulative undersize distribution curve of the volume-averaged size distribution, determined in a customary manner by means of laser diffraction techniques. For the purposes of this study, these values were determined using the Cilas 1064 instrument from Cilas (France).

The pigments preferably have a $d_{50}$ of 11 to 35 µm and more preferably of 13 to 25 µm, and more preferably still of 15 to 21 µm. Furthermore, in their size distribution, these silver dollar pigments preferably have a $d_{90}$ of 23 to 50 µm and more preferably a $d_{90}$ of 25 to 35 µm.

A $d_{50}$ means that 50% of the pigments are within the stated size range. A $d_{90}$ means that 90% of the pigments are within the stated size range.

Below a $d_{50}$ of 11 µm, the pigments no longer have the necessary gloss values in the paint application. Above a $d_{50}$ of 35 µm, unwanted sparkle effects and significant gloss reduction occur. Above a $d_{50}$ of 25, the visual impression of a coherent, liquid metal film subsides.

These platelet-shaped silver dollar pigments with leafing properties are characterized preferably by an average thickness of more than 80 to 150 nm, preferably by an average thickness of 100 to 135 nm.

The average thickness can be determined by counting in the SEM, as described in DE 103 15 775 A1, for example, or by the customary spreading method.

Below an average platelet thickness of 80 nm, scattering centers may occur in the marginal regions of the aluminum effect pigments, and may lead to a reduction in the gloss properties. Above an average thickness of 150 nm, the paint applications exhibit inadequate gloss values.

Examples of leafing aluminum effect pigments of this kind, preferably silver dollar pigments, are the commercially available pigments VP-59710/G (ECKART) or EBP 251 (Silverline).

The metallic paints of the invention that are produced with these leafing silver dollar pigments are suitable primarily in multicoat finishes, since they have excellent recoatability. In this context, aqueous metallic paints in particular are preferred.

In another preferred embodiment of the invention, extremely thin leafing aluminum effect pigments are used for preparing the new metallic paint. Such pigments are situated in terms of their optical properties between the aforementioned silver dollar pigments and the PVD pigments, and are capable of at least partly replacing the PVD pigments in the most high-value applications (see, for example, DE 103 15 775 A1). The term "platinum dollar pigments" is also used here (Platindollar®, brand name of the company Eckart).

These platelet-shaped aluminum effect pigments which are also referred to as platinum dollars, with a very smooth surface and round edges, with high hiding power, exhibit a very low average thickness and, moreover, a very narrow thickness distribution.

The aluminum pigments that are used in the present invention are produced by an extremely gentle shape-imparting milling operation on a fine and relatively narrow-band aluminum grit. The aluminum grit, prepared preferably in "atomizers" by atomization of liquid aluminum, preferably an aluminum melt, and classified, where appropriate, to the desired particle size distribution, and comprising aluminum particles in a spherical to slightly ellipsoidal form, is a very fine metal grit having a very narrow size distribution and a low oxide content, at less than 5% by weight. This aluminum grit has a size distribution, determined in a known way by laser diffraction spectrometry (e.g., by means of a Helos instrument from Sympatec GmbH, Clausthal-Zellerfeld, Germany), of $d_{grit,10} < 3.0$ μm, a $d_{grit,50} < 5.0$ μm and a $d_{grit,90} < 8.0$ μm. The size distribution preferably embraces a $d_{grit,10} < 0.6$ μm, a $d_{grit,50} < 2.0$ μm and a $d_{grit,90} < 4.0$ μm.

The aluminum grit, after classification where appropriate, is milled using a grinding mechanism in the presence of solvent, such as white spirit, solvent naphtha, isopropanol, ethers, ketones, esters, etc., for example, and lubricants, such as fatty acids having alkyl radicals of at least 14 to 24 C atoms, for example, preferably saturated fatty acids such as stearic acid, for example, and grinding media, such as spherical bodies such as—preferably—balls with individual weights of 2 to 13 g, for example. Subsequently the pigment may be further size-classified or else comminuted. Typical methods of size classification include, for example, wet screening, decanting, or else separation by sedimentation. In the case of screening, the coarse fraction is generally removed by screening. With the other methods, it is possible more particularly to separate off the ultrafine fraction. Subsequently the suspension is separated from excess solvent, by means of a filter press, for example, and pasted preferably with solvent.

In one preferred embodiment the leafing aluminum effect pigments, preferably platinum dollar pigments, have a $d_{50}$ of 2 to 25 μm and preferably of 2.5 to 10 μm and more preferably 3 to 8 μm.

Below a $d_{50}$ of 2 μm the gloss value on application is too low and the wear-scar coverage is inadequate; above 25 μm, the observation has likewise been made of a drop in the gloss in a single-coat finish.

With further preference these leafing aluminum effect pigments, preferably platinum dollar pigments, in their size distribution cumulative undersize curve, have a $d_{90}$ of 8 to 40 μm and more preferably of 9 to 14 μm (Cilas 1064). These figures should preferably be understood such that the lower limit of $d_{90}=8$ μm is to be accorded primarily predominantly to pigments having $d_{50}$ values in the lower range, about 2 to 4 μm, for example, and the upper limit of $d_{90}=16$ μm predominantly to pigments having $d_{50}$ values in the upper range, about 5 to 8 μm, for example.

These platinum dollar pigments are characterized preferably by an average thickness $h_{50}$ of 15 to 100 nm, preferably by an average thickness of 20 to 75 nm, and more preferably of 25 to 60 nm.

Beneath an average thickness of 15 nm, the pigments become too dark, which is attributable to the loss of metallic reflection capacity with retention of the high absorption properties of the aluminum. Moreover, the mechanical properties of the aluminum are unfavorably altered: the pigments become too fragile. Above an average thickness of 75 nm, there is an increasingly adverse effect on the advantageous optical properties, and, above 100 nm, properties corresponding to a chrome-effect paint are no longer obtained.

These platinum dollar pigments used in accordance with the invention are characterized by a relative breadth of the thickness distribution Δh, determined via customary thickness counting by scanning electronmicroscopy, and calculated according to the formula $$\Delta h(\%) = 100 * \frac{h_{90} - h_{10}}{h_{50}}, \qquad (I)$$

of preferably 30% to less than 70%, more preferably of 35% to 67%, more preferably still of 40% to 65%, and with particular preference of 40% to 60%.

Above a Δh of 70%, the advantageous properties of these aluminum pigments in the metallic paint of the invention are no longer observed. It has to date not been possible to prepare pigments having a relative breadth of the thickness distribution Δh of below 30%.

The driving force for a plane-parallel orientation of the platelet-shaped metallic pigments—in addition to surface-chemical incompatibilities of the aluminum pigments in relation to the binder system—is primarily the shape factor of the pigments. The shape factor is the ratio of longitudinal extent $d_{50}$ to the thickness $h_{50}$ of the pigments. The longitudinal extent is determined primarily on the basis of laser diffraction methods. In general, the $d_{50}$ of the cumulative undersize curve is employed here.

The shape factor of the two leafing aluminum pigment types (silver dollar and platinum dollar) used in the metallic paint of the invention is 80 to 400. Preferably 100 to 350, more preferably 200 to 300.

A disturbed orientation of the aluminum effect pigments in the coating leads not only to low gloss but also to the formation of "mottle", i.e., instances of light/dark shading which lessen the optical quality of the paint surfaces and can be ascertained on a size scale of several decimeters.

The roughness value R, which is characteristic of the roughness, is the ratio of the specific surface area—as measured by the BET method (DIN 66132)—to the geometric pigment surface area. The pigment surface area, disregarding the margin of the pigments, can be calculated as twice the spreading value determined by means of a known formula from the $h_{50}$ value (SEM), using the formula given below:

$$R = \text{BET value}(m^2/g) \times 10^4 : 2 \times \text{spreading value}(cm^2/g) \quad \text{(II)}$$

In place of the experimentally determined spreading value it is also possible to use the spreading value calculated from the average thickness $h_{50}$, determined via the SEM evaluation, in the above formula:

$$\text{Spreading value} = 10^7/h_{50} \text{ (nm)} \times 2.5 \text{ (g/cm}^3\text{)} \quad \text{(III)}$$

(2.5: density of the aluminum pigments)

The roughness value R is a relative value, since neither method of determining pigment surface area produces physically exact results. An ideally smooth surface ought theoretically to possess a roughness value of 1, but in actual fact values of less than 1 are occasionally found.

The above-described two types of aluminum pigment that are used in the metallic paint of the invention have a roughness value, characterizing the roughness or waviness, and owing to mechanical deformation, of 0.3 to 1.0 and preferably of 0.5 to 0.9, which prevents plane-parallel attachment, i.e., the agglomeration of aluminum pigments with one another, without these pigments suffering any substantial adverse effect in their optical properties, such as reflectance and gloss.

Values this low show that the pigment surfaces in question are very smooth.

The total amount of the leafing aluminum effect pigments used in the paint system of the invention, which is also referred to as the level of pigmentation, based on the total weight of the metallic paint of the invention, is preferably less than 10% by weight. It is more preferred to use less than 5% by weight, and very preferably less than 3% by weight.

On account of the low pigment thickness, its specific hiding power is excellent, and so extremely low levels of pigmentation are sufficient to provide the desired visual impression.

On account of their PVD pigment-like, low thickness and their narrow thickness distribution, the leafing aluminum pigments that are used in the chrome-effect paint of the invention are distinguished by a unique metallic appearance and a high hiding power.

Moreover, their very narrow thickness distribution results in good orientation and uniform pigment stacking in the metallic paint.

The passivated—that is, provided with a corrosion control coat—aluminum pigments that are used in conventional aqueous metallic effect paints and which have a greater thickness and a broader thickness distribution than the leafing aluminum pigments used in the metallic paint of the invention may be subject to disuniformities in pigment stacking. For instance, very thick pigments, in particular, may act as "spacers", a phenomenon which adversely affects the orientation of the surrounding pigments. This of course deleteriously affects important properties of the pigment, such as gloss, flop and, in certain circumstances, hiding power, for example.

The leafing aluminum effect pigments used in the metallic paint of the invention possess an average thickness and a narrow thickness distribution, similar to PVD pigments, and therefore resemble the PVD pigments in terms of their optical properties, but are substantially easier and hence more inexpensive to prepare than PVD pigments, with greatly improved handling properties, as a result of which, for example, it is possible to realize a substantially higher concentration in preparations. Unlike the aluminum effect pigments used in the case of the present invention, PVD aluminum pigments are absolutely planar. The increased roughness in the leafing aluminum effect pigments for use in accordance with the invention, in comparison to PVD aluminum pigments, does not result in any optically noticeable adverse effect in terms of gloss after the metallic paint of the invention has been applied.

It is thought that the optical effect of a coherent metal film, which induces the visual impression of a substantially unstructured, preferably unstructured metal film, comes about as a result of the fact that the aluminum pigments, following application (coating), are stacked one atop another in the closest possible way.

This is a result in particular of the fact that, as floating pigments ("leafing pigments"), they are localized within a very small three-dimensional layer above the basecoat.

On account of their thinness, they are able to stack on one another very well, without any problems occurring such as haze. Such behavior is known for similarly thin aluminum pigments prepared by the PVD process, that conform completely to their substrate.

It is thought that the near-mirrorlike metallic effect of the aluminum effect pigments in the metallic paint of the invention is attributable primarily to their leafing properties and also, causily, to the low pigment thickness and their low breadth of thickness distribution, and also to their shape factor, which is considered to be the driving force for the plane-parallel orientation of the pigments in the paint.

The silanes that are used as film formers in the metallic paint of the invention are, advantageously, organofunctional silanes of the formula $$R^1{}_a R^2{}_b SiX_{(4-a-b)} \quad \text{(IV)}$$

In this formula $R^1$ is a nonhydrolyzable radical, $R^2$ is a nonhydrolyzable radical which carries at least one epoxy group, and X stands for radicals which are alike or different from one another and are selected from the hydroxyl group and hydrolyzable substitution products of a hydroxyl group, with a being able to take on integral values from 0 to 3, and b being able to take on integral values from 1 to 3, and a and b together having a value of 1, 2 or 3.

In a further preferred embodiment the epoxysilane with the general formula (IV) is in oligomeric or polymeric form, the units being connected to one another via Si—O—Si bridges.

In one preferred embodiment a is 0 and b is 1.

The radical X is composed preferably of OH groups, halogen groups or alkoxy groups having 1 to 6, preferably 1 to 3, C atoms. Preference is given here to alkoxy groups, and particular preference to methyl- and/or ethylalkoxy groups. The alcohol that is liberated when the alkoxy groups are hydrolyzed is, in one preferred version, removed by distillation, and so the epoxysilane is substantially free of solvents.

The group $R^2$ is preferably a glycidyl or a glycidyloxy-($C_1$ to $C_{20}$)-alkylene radical and also oxiran-2-yl, 2,3-epoxy- and 3,4-epoxycyclopentyl, 2,3- and 3,4-epoxycyclohexyl, and 2,3-, 3,4-, and 4,5-epoxycycloheptyl radicals, not least oxiran-2-yl and 2,3- and 3,4-epoxycyclohexyl groups selected. In particular it is a γ-glycidyloxyethyl, γ-glycidyloxypropyl, γ-glycidyloxybutyl, γ-glycidyloxypentyl, γ-glycidyloxyhexyl or 2-(3,4-epoxycyclohexyl)ethyl radical.

The group $R^1$ is preferably selected from the group consisting of ($C_1$-$C_{40}$)-alkyl, -fluorinated alkyl, -part-fluorinated alkyl; ($C_2$-$C_{40}$)-alkenyl, -alkynyl; ($C_6$-$C_{36}$)-aryl, fluorinated -aryl, part-fluorinated -aryl; ($C_7$-$C_{40}$)-alkylaryl, -arylalkyl, -fluorinated alkylaryl, -part-fluorinated alkylaryl; ($C_8$-$C_{40}$)-alkenylaryl, -arylalkynyl, -alkynylaryl; ($C_5$-$C_{40}$)-cycloalkyl, -alkylcycloalkyl, -cycloalkylalkyl groups.

For a=2, the $R^1$ groups may be alike or different from one another, but are preferably alike. Preferably $R^1$ is methyl, ethyl or propyl or a=0.

Additionally it is possible to use oligomeric silanes of the formula (IV), which may also be mixtures and/or oligomers of different silanes.

Particular preference is given to the use, on account of their ready availability, as epoxysilanes and/or epoxysilicones, of oligomers of γ-glycidyloxypropyl-trimethoxysilane or γ-glycidyloxypropyltriethoxysilane or mixtures thereof. γ-Glycidyloxypropyltrimethoxysilane is available commercially, for example, under the name Dynasylan GLYMO from Degussa (Untere Kanalstrasse 3, D-79618 Rheinfelden, Germany).

Further silanes which can be used in the paint of the invention are described comprehensively for example in the BASF U.S. Pat. No. 7,109,263 B2.

Such silanes are available commercially. They are, for example, many representatives of the products produced by Degussa, Rheinfelden, Germany and sold under the trade name "Dynasylan®", and of the Silquest® silanes produced by OSi Specialties or of the GENOSIL® silanes produced by Wacker, Burghausen, Germany.

The epoxysilane or epoxysilane mixture that is used is preferably a liquid at application temperatures of around 0 to 40° C. By virtue of this property it may be advantageous, particularly in the case of solvent-containing paint systems, in order here to minimize the VOC fraction.

The functional silane groups can be reacted preferably with chemically complementary groups of the coating material, in order to bond the organofunctional silane covalently to the coating composition.

Moreover, it is possible to use commercial binders in the paint of the invention. The binders may be curable physically, chemically or thermally—in combination with electromagnetic radiation ("dual cure"). Preferably the binders are compatible with water.

Thermally curable binders may be self-crosslinking or externally crosslinking.

Self-crosslinking binders possess both of the kinds of complementary reactive groups that are necessary for curing; externally crosslinking binders require a curing agent or crosslinker.

Examples of possible binders include those based on polyurethanes, polyamides, polyureas, melamine resins, polyamides, polyacrylates, polymethacrylates, epoxy resins, polyethers or polyesters. Also possible is the use of combinations of these functionalities, such as polyester-polyurethanes polyurethanes, polyester-polyacrylate or polyacrylate-polyurethanes, for example.

It is preferred to use amine-functional binders, containing primary, secondary or tertiary amines, and, of these, with particular preference, melamine resins. Binders of this kind are described for example in DE 101 540 30 A1.

Solvents employed in the metallic paint of the invention include water and/or organic solvents, preferably alcohols such as n-butanol, isopropanol, Dowanol PM, glycols such as butylglycol, butyldiglycol, and ethyldiglycol, and hydrocarbons such as white spirit or solvent naphtha, and also heterocyclic compounds such as N-methylpyrrolidone.

The metallic paint of the invention preferably has a water content and/or solvent content of 5% to 85%, preferably 6% to 60%, more preferably 10% to 50%, by weight, based on the total weight of the paint.

The leafing metallic paint of the invention may also comprise additives such as fillers, reactive diluents, UV absorbers, light stabilizers, free-radical scavengers, photoinitiators or coinitiators, crosslinking agents, deaerating agents, slip additives, inhibitors, defoaming agents, emulsifiers, wetting and dispersing agents, adhesion promoters, flow control agents, film-forming auxiliaries, thickeners, flame retardants, siccatives, dryers, antiskinning agents, corrosion inhibitors, anticorrosion pigments, waxes and/or combinations of these additives.

Additives which can be used for a particular advantage also include commercial additives from BYK, Wesel, Germany.

The overall solids content, i.e., the nonvolatile content to DIN 53216, of the metallic paint of the invention is 5% to 40% by weight. The overall solids content is preferably 9% to 30% and more preferably 10% to 25% by weight.

At solids content below 5% by weight, the finish after application and curing (drying) is no longer mechanically robust. The paint contains too little binder.

Solids contents above 40% by weight are known per se in the field of conventional coating compositions—"high-solids", as they are known—but cannot be transposed to aqueous systems with such thin aluminum pigments. Here, the rheology of the coating compositions would be too poor.

The leafing aluminum effect pigments that are used for paint preparation in accordance with the invention are employed preferably in the form of pretreated premixes, more preferably pastelike premixes, which are compatible with the at least one organofunctional silane to be used in accordance with the invention, which may also be a polysiloxane, without phase separation; examples include commercial leafing aluminum pigment pastes from the STAPA product series of Eckart GmbH & Co. KG.

The solids content of the aluminum pigment paste used advantageously for preparing the metallic paint of the invention is preferably 20% to 65%, more preferably 25% to 60%, and very preferably 30% to 55%, and even more preferably 40% to 50% by weight, based in each case on the total weight of the aluminum paste.

At a solids content of more than 65% by weight, the aluminum pigments may undergo agglomeration in the paste, which would critically impact the optical effect. Furthermore, the higher specific surface area of the extremely thin pigments has a higher solvent demand for complete wetting. Below 20% by weight, the paste becomes too runny, and can no longer be metered precisely for addition to the paint, without additional stirring steps.

Solvents used are preferably the solvents already employed for the forming of the pigments, such as white spirit and/or solvent naphtha, butylglycol or isopropanol, for example.

The aqueous and recoatable metallic paint applied to a metallic or other substrate produces a high-gloss, unstructuredly metallic coating. Its optical effect corresponds to the appearance phenomenon known under the rubric of "chrome effect".

This aqueous, recoatable metallic paint with pronounced metallic gloss finds use with particular advantage for vehicle finishes such as, for example, rim finishes, or else for vehicle refinishes.

The metallic paint of the invention, which may also be termed a chrome-effect paint, can be used with particular advantage as a basecoat—without a clearcoat finish. Of course, if it should be desired, it is also possible for a clearcoat to be applied atop this basecoat.

The metallic paint, which can be applied easily by all known processes and readily recoated, and with a very high gloss effect of preferably more than 350, is characterized in particular by high wipe resistance and scratch resistance, abrasion stability, and abrasion-scar coverage.

The waterborne and/or solventborne metallic paint can be readily applied by all known application methods, such as, for example, industrial airless spraying, dipping, spraying (HVLP), electrostatically (ESTA), plasma, flowcoating, roller application, can coating, and coil coating, to metallic or other substrates, with particular advantage as a basecoat without a clearcoat coating.

This new metallic paint can be used with particular advantage for high-gloss coatings, such as automobile finishes, refinishes, industrial coatings, and coatings on metal, plastics, wood or glass, for example.

The metallic paint of the invention may take the form of a 1-component (1K) or else a 2-component (2K) metallic paint.

EXAMPLES

The examples which follow illustrate the invention, but without restricting it.

Inventive Example 1

2-Component System

To prepare an inventive metallic paint for a vehicle rim application, a commercially available leafing aluminum pigment paste was used which bore the designation VP-59710/G from Eckart & GmbH Co. KG, D-91235 Velden, Germany. This paste contains silver dollar pigments, obtained by ball milling in stearic acid and isopropanol, having an $h_{50}$ of 120 nm (SEM) and a particle size distribution $d_{50}$ of 17 μm and a $d_{90}$ of 29 μm, in dispersion in a commercial binder agent (Maprenal 900W from Surface Specialties) and an epoxysilane used as film former (Wetlink 78 from GE).

1 part by weight of this pasted pigment, which constitutes component 1, was diluted with 4 parts by weight of a component 2. This second component is composed of 1 part by weight of organic solvent (e.g., butylglycol) and 3 parts by weight of water. This 2-component system is then mixed at room temperature for 10 minutes. The rheological properties of the metallic paint were set using commercial thinners/thickeners, and the paint spray viscosity was set using commercial butylglycol and distilled water. The metallic paint, which had a solids content of 3% to 50% by weight, a viscosity (DIN 53211) of 11 s to 60 s, and a film-forming agent content of 1.0% to 45.0% by weight silane, and also a melamine resin content of 1.0% to 50.0% by weight (% by weight based on the total paint weight), was applied using an HVLP spray gun (ESTA/high-pressure/HVLP) at 1 to 6 bar to a primed substrate, with a film thickness of 1-25 μm, and then dried at a temperature of 100 to 300° C. for 20 to 60 minutes.

Inventive Example 2 a) Atomizing

In an induction crucible furnace (Induga, furnace volume approximately 2.5 tonnes), aluminum bars are fed in continuously and melted. In the so-called forehearth, the aluminum melt is in liquid form, at a temperature of about 720° C. A plurality of nozzles, operating in accordance with an injector principle, are immersed in the melt and atomize the aluminum melt vertically upward. The atomizing gas is compressed to 20 bar in compressors (Kaeser) and heated to about 700° C. in gas heaters. The resulting aluminum grit cools and solidifies in flight. The induction furnace is integrated into a closed plant. Atomization takes place under inert gas (nitrogen). The aluminum grit it deposited first in a cyclone, the powderous aluminum grit separated therein having a $d_{50}$ of 14-17 μm. This is followed, for further separation, by a multicyclone, the powderous aluminum grit deposited in this multicyclone having a $d_{50}$ of 2.3-2.8 μm. Gas/solid separation takes place in a filter (Alpine) with metal elements (Pall). In this case the finest fraction obtained is an aluminum grit having a $d_{10}$ of 0.4 μm, a $d_{50}$ of 1.0-1.9 μm, and a $d_{90}$ of 2.0-3.8 μm.

b) Milling

A pot mill (length: 32 cm, width: 19 cm) is fed with 4 kg of glass beads (diameter: 2 mm), 75 g of very fine aluminum grit from a), 200 g of white spirit, and 3.75 g of stearic acid. This charge is then milled at 58 rpm for 15 hours. The product is separated from the milling beads by rinsing with white spirit, and then screened in a wet-screening operation on a 25 μm screen. The fine fraction is largely free from white spirit on a suction filter and then pasted up with white spirit in a laboratory mixer (about 50% solids fraction).

The platinum dollar pigments contained in this aluminum paste have an $h_{50}$ of 50 (SEM) and a particle size distribution characterized by a $d_{50}$ of 5 μm and a $d_{90}$ of 11 μm (Cilas 1064).

These pigments are dispersed in a commercial binder (Maprenal 900W from Surface Specialties) and an epoxysilane that is used as the film former (Wetlink 78 from GE). 1 part by weight of this pigment paste was introduced with the same amount of an organic solvent (BG) and 2 parts by weight of demineralized water and also 1 part by weight of a commercial binder (Setal 6608 from Cytec), and these components were mixed at room temperature for about 10 minutes. The pigment mixture was admixed with 0.05 part by weight of a commercial catalyst (Nacure 2500 from Worlee). The rheological properties of the metallic paint were set using commercial diluents. The spray viscosity of the paint was set using butylglycol and distilled water.

The metallic paint, which had a paint solids content of 3% to 50% by weight and a viscosity (DIN 53211) of about 11 s to 60 s, was applied to a primed substrate, using a conventional spray gun (ESTA/high pressure/HVLP) with a pressure of 1 to 6 bar, and dried at a temperature of 80° C. to 160° C. for 5 to 60 minutes. Thereafter the aqueous leafing metallic paint coating was recoated with a 2-component PUR clearcoat, and the coating system was dried at 80° C. for 30 minutes.

Comparative Example 3

Commercially available Metalure® L55700 (PVD pigment, Eckart), aluminum pigment dispersion in methoxypropyl acetate (10% by weight solids fraction).

Pigment parameters: $h_{50}$: 47 nm (SEM) and a particle size distribution $d_{50}$ of 13 μm and $d_{90}$ of 21 μm (Cilas 1064).

For preparing the 2-component metallic effect paint, comprising PVD pigments, for vehicle rim application, 15 parts by weight of the aluminum pigment dispersion Metalure L55700 from Eckart were incorporated by stirring, in a dissolver (paddle stirrer), into 13 parts by weight of a commercial film former (cellulose ester product CAB 381-2 from Eastmann) and then mixed intensively for about 20 minutes with 0.1 part by weight of a commercial emulsifier (Lipotin 100 from Cargilltexturizing) and with 1.5 parts by weight of a commercial acrylic resin (Uracron CY 474 E from DSM) and also with 0.1 part by weight of a commercial tackifier resin (LTW from Degussa). Dispersed into the homogenized pigment paste were, with stirring, 24 parts by weight of a commercial butyl acetate 98/100 and 1.5 parts by weight of a commercial, low molecular mass additive comprising methylpolysiloxane (Baysilone® MA with 0.4% xylene, from Borchers) with about 2.6 parts by weight of a fluorine-containing wetting additive (Zonyl® FSG with 1% butyl acetate 98/100, from Degussa) and also with about 33 parts by weight of a commercial diluent (methoxypropyl acetate). The second paint component was prepared by diluting about 1.4 parts by weight of a commercially traded curing agent (Desmodur® N 75 from Bayer) with butyl acetate 98/100. The two paint components were not mixed until immediately before processing (application), mixing taking place in a quantitative ratio of 9 to 1, to give an application-ready 2-component chrome-effect paint. The spray viscosity of about 15 s (DIN 53211-4 mm cup at 23° C.) of the 2-component metallic paint, which had a pot life of about 5 h (DIN 53150-4 mm cup, 23° C.), was set by addition of commercial diluent (methoxypropyl acetate).

The metallic paint, having a solids content of about 3% to 10% by weight and a binder content of 1.5% to 8% by weight (% by weight based on the total paint weight), was applied by means of a spray gun (HVLP/ESTA/high pressure) at 1 to 6 bar to a primed substrate, with a film thickness of 1-10 μm, and then dried at a temperature of 70° C. for about 60 minutes.

Comparative Example 4

Commercially available SILVERSHINE® P4110 (Eckart).

This is likewise a PVD aluminum pigment, which, in the same way as in comparative example 3, was incorporated into the 2-component paint system and then applied.

This nonleafing PVD pigment has an $h_{50}$ of 60 nm (SEM) and a particle size distribution $d_{50}$ of 9-11 μm, and $d_{90}$ of max. 20 μm (Cilas 1064). Preparation/application of the paint pigmented with this pigment took place in the same way as in comparative example 3.

Comparative Example 5

SILVERSHINE® 51100 (Eckart).

High-brilliance nonleafing aluminum pigment for paint, based on DE 103 15 775 A1.

This aluminum pigment was prepared like that from example 2, but the milling of the fine aluminum grit was carried out with a lubricant containing oleic acid, leading to a nonleafing pigment.

Pigment parameters: $h_{50}$ of 50 nm (SEM) and a particle size distribution $d_{50}$ of 10 μm and also $d_{90}$ of 15 μm (Cilas 1064).

The pigment, in the same way as in example 2, was processed to a paint and applied.

Comparative Example 6

Commercially available Silvershine® 52100 (based on DE 103 15 775 A1, Eckart)

This high-brilliance nonleafing aluminum pigment for paint, which is prepared by means of conventional ball milling, is in solution in white spirit/solvent naphtha and has metallic optical qualities, with an $h_{50}$ of 70 nm (SEM) and a particle size distribution $d_{50}$ of 20 μm and $d_{90}$ of 32 μm (Cilas 1064), was likewise, in the same way as in example 2, processed to a paint and applied.

Comparative Example 7

Commercially available STAPA® METALLUX 3540 (Eckart), (nonleafing silver dollar pigment) for paint For preparing this metallic paint for vehicle rim application, a commercially traded aluminum pigment dispersion STAPA METALLUX 3540 from Eckart was used. This pigment dispersion contains silver dollar aluminum pigments ballmilled in white spirit/solvent naphtha, having an $h_{50}$ of 320 nm (SEM) and a particle size distribution $d_{50}$ of 18 μm and also $d_{90}$ of 27 μm (Cilas 1064).

1 part by weight of this pigment dispersion was mixed with 1 part by weight of butyl acetate and also 17.5 parts by weight of a commercial base mixing varnish for two-coat metallic finishes, "Mipa BC Mischlack" from MIPA, in a dissolver (paddle stirrer) at room temperature for 10 minutes. The spray viscosity of the present metallic paint was set using commercial diluent. The ready-to-apply metallic paint was applied using an HVLP spray gun/ESTA/high pressure at 1 to 6 bar to a primed substrate, with a film thickness of 10 to 30 μm, and then dried at a temperature of 80° C. for 30 minutes.

Comparative Example 8

Commercially available STAPA® METALLUX 2154 (nonleafing silver dollar, Eckart)

This aluminum dispersion containing a silver dollar pigment for paint, prepared by means of conventional ballmilling and suspended in solvent naphtha/white spirit (2.1 ppw/ppw), having an $h_{50}$ of 290 nm (SEM) and a particle size distribution $d_{50}$ of 20 μm and $d_{90}$ of 32 μm (Cilas 1064), was likewise, in accordance with comparative example 7, processed to a paint and applied.

Comparative Example 9

Commercially available STAPA® 5 (leafing aluminum pigment paste of cornflake type from Eckart), for paint.

This silver-colored acrylate reflection paint for vehicle rim application was prepared using 12 parts by weight of a commercially traded leafing aluminum pigment dispersion Stapa 5 from Eckart. This comprises cornflake-type aluminum pigment obtained by size-reduction grinding, with very rough surfaces and a particle size distribution $d_{50}$ of 15 μm and also a $d_{90}$ of 41 μm (Cilas 1064). 12 parts by weight of this aluminum pigment paste (65% by weight solids fraction) were pasted up in a dissolver (paddle stirrer) with 12 parts by weight of commercial solvent naphtha and then mixed with 20 parts by weight of a commercial acrylic emulsion which is used as binder (Neocryl B 731 from Noveon) and also with 46 parts by weight of a commercial solvent/diluent (methoxypropanol, toluene, Kristalloel) and 2 parts by weight of a commercial "aliphatic amine" (Forbest 410 from Raybo) and also 8 parts by weight of a commercial alkyd resin solution (Uralac surface coating 331 W60 from DSM) at room temperature for 10 minutes. The spray viscosity of this paint (DIN 53211-4 mm cup at 23° C.) of 19 s was set by addition of commercial diluent (Kristalloel 21). The metallic paint was applied by means of an HVLP spray gun/ESTA/high pressure at 1 to 6 bar to a primed substrate, with a film thickness of 10 to 30 μm, and then dried at 80° C. for 30 minutes.

Inventive Example 10

1-Component System

An inventive metallic paint for vehicle rim application was prepared using a leafing aluminum pigment paste available commercially with the designation VP-59710/G from Eckart & GmbH Co. KG, D-91235 Velden, Germany. This paste contains silver dollar pigments obtained by ballmilling in isopropanol and stearic acid, having an $h_{50}$ of 120 nm (SEM) and a particle size distribution $d_{50}$ of 17 μm and a $d_{90}$ of 29 μm, in dispersion in a commercial binder agent (Maprenal 900W from Surface Specialties) and an epoxysilane which is used as film former (Wetlink 78 from GE). 1 part by weight of this pigment paste was diluted with 3 parts by weight of an organic solvent (e.g., butylglycol) and the components were mixed at room temperature for about 10 minutes.

The rheological properties of the metallic paint were set using commercial butylglycol. The metallic paint, which had a solids content of 3% to 50% by weight, a viscosity (DIN 53211) of 11 s to 60 s, and a film-forming agent content of 1.0% to 45.0% by weight silane, and also a melamine resin content of 1.0% to 50.0% by weight (% by weight based on the total paint weight), was applied using an HVLP spray gun (ESTA/high pressure/HVLP) at 1 to 6 bar to a primed substrate, with a film thickness of 1-25 µm, and then dried at a temperature of 100 to 300° C. for 20 to 60 minutes.

The gloss and surface structure (dullness) properties (optical properties) of the metallic applications (examples 1 to 9) were determined, and the mottling was assessed visually.

The gloss values as determined using a commercial Trigloss gloss meter from Byk Gardner, at a measurement angle of 20° and 60°, are set out in table 1 below.

TABLE 1

| Experiment | Gloss 20° | Gloss 60° |
|---|---|---|
| Inv. example 1 | 290 | 471 |
| Inv. example 2 | 460 | 432 |
| Comp. example 3 | 70 | 138 |
| Comp. example 4 | 94 | 160 |
| Comp. example 5 | 13 | 56 |
| Comp. example 6 | 29 | 98 |
| Comp. example 7 | 17 | 60 |
| Comp. example 8 | 22 | 77 |
| Comp. example 9 | 16 | 70 |

From the measurements in tab. 1 it is evident that the inventive metallic finishes of examples 1 to 2 exhibit substantially higher gloss values at both measurement angles of 20° and 60° than the gloss values of the metallic finishes of comparative examples 3 to 9.

It was surprisingly found that the inventive metallic finishes of examples 1 and 2 also have substantially higher gloss values than metallic paints of examples 3 and 4, which contained PVD pigments. A possible explanation for this is that the aluminum pigments used in the inventive metallic paint, by virtue of their roughness or waviness, are positioned above one another in such a way that there are only dot-like areas of contact with one another. As a result, in contrast to PVD pigments, the formation of short-distance forces of attraction, such as van der Waals forces or hydrogen bonds, is minimized and hence agglomeration or aggregation of the aluminum pigments in the paint is made more difficult, as a result of which the leafing aluminum pigments adopt an arrangement in the region of the paint surface—i.e., align parallel to the paint surface—in such a way that the rays of light that strike the paint surface are reflected (mirror effect) in such a way that the paint has high gloss values.

Moreover, it was found visually that the inventive metallic finishes of inventive examples 1 and 2 do not have structures discernible to the naked eye. The visual impression of these finishes corresponds to that of a "liquid" metal. In contrast, the finishes of comparative examples 4 to 9, carried out with conventional metallic paints, and, of these, especially those of examples 5 to 9, are characterized by a more or less distinct surface structuring. Although the human eye is unable to distinguish the individual pigment particles in the finish, it does see particulate structures.

Furthermore, the paint surface of the metallic finishes of examples 1 to 9 were evaluated for unwanted mottling. Mottling refers to the instances of light/dark shading on the paint surface. This optical phenomenon, which adversely affects the surface quality and hence reduces the optical quality of finishing, plays a particularly large part especially at low paint film thicknesses and in extensive finishes.

At the outcome of this visual evaluation with the metallic finishes of examples 1 to 9, under comparable application conditions (finishing of a wedge by means of pneumatic application on the LabPainter from LacTec; test panels measuring 70 cm×30 cm; conveying speed of 0.8 m/s; gun paint volume 200 ml/min; horn air 400 Nl/min, and atomizer air at 6000 Nl/min; dry paint film thickness (wedge) 5-24 µm), it was found that the metallic finishes produced from the inventive metallic paints of inventive examples 1 and 2, and also the metallic finish of example 9, which had leafing properties but was not recoatable, have no mottling, or at least reduced mottling as compared with the metallic finishes of comparatives examples 3 to 8, as is evident from table 2 below.

TABLE 2

| Experiment | Rating (1-5) | Dullness (Dorigon) (longwave) |
|---|---|---|
| Inv. example 1 | 1 | 63.2 |
| Inv. example 2 | 1 | 45.3 |
| Comp. example 3 | 4 | 79.0 |
| Comp. example 4 | 4 | 73.6 |
| Comp. example 5 | 3 | 91.0 |
| Comp. example 6 | 3 | 87.4 |
| Comp. example 7 | 2 | 92.4 |
| Comp. example 8 | 2 | 87.9 |
| Comp. example 9 | 1 | 94.5 |

The advantageous optical effect evident from table 2 above for the inventive finishes (inventive examples 1 and 2) as compared with conventional finishes (comparative examples 3 to 9) can be explained by the optimum orientation in the paint film of the very thin, platelet-shaped aluminum pigments, and by their high opacity. These two pigment effects produce the low tendency toward mottling at low paint film thicknesses. Finally, the visual appearance of the metallic finishes of examples 1 to 9 was investigated in respect of waviness and orange peel. For this purpose, conventional measuring technology (micro-wave-scan) from BYK Gardner was used to determine the dullness (longwave) values, which are likewise apparent from table 2:

The aim of the measurements on which the values in tab. 2 are based was a correlation of the visual assessment with the corresponding measurements of DOI (distinctness of image). The DOI is calculated from the variables of dullness (du) and waviness (Wa, Wb), i.e., DOI=f (du, Wa, Wb). Light-scattering centers <0.1 mm influence dullness (du), waviness (Wa, Wb) represent wave structures with a size order of 0.1-0.3 mm or 0.3-1.0 mm. The calculated DOI and also the dullness (du) and waviness (Wa, Wb) measurements are indicated on a scale of 0-100, with a higher numerical value in terms of DOI being positive but in terms of dullness (du) and waviness (Wa, Wb) being negative.

The measurements in table 2 above demonstrate that the optical appearance of the finishes of examples 1 and 2, containing the inventive metallic paint, exhibits a substantially lower waviness with substantially less orange peel than the visual appearance of the metallic finishes of examples 3 to 9 containing commercially traded metallic paints.

In a summary evaluation of the experimental results, it is found that the finishes obtained with the metallic paint of the invention, in the context of vehicle rim application, exhibit significantly better optical properties, in terms of gloss and mottling, with substantially better optical qualities in terms of waviness and orange peel, than the finishes of commercially traded metallic paints.

The inventive aqueous metallic paint with a pronounced metallic luster (chrome effect), moreover, has abrasion-scar coverage which was hitherto unachieved with conventional PVD paints, and can be used both as a one-coat paint and as a basecoat in multicoat finishes on metallic surfaces, with particular advantage for vehicle finishing, and with very particular advantage for vehicle rim finishing, with high productivity.

What is claimed is:

1. A metallic paint comprising at least one of water and organic solvent, and also at least one film-forming agent, at least one organofunctional silane, and at least one metallic effect pigment, wherein the metallic effect pigment is a leafing aluminum effect pigment.

2. The metallic paint of claim 1, wherein the leafing aluminum effect pigments have an X-ray diffractogram having one, two or more main peaks which do not correspond to the [111] and/or [222] reflections.

3. The metallic paint of claim 1, wherein the film-forming agent further comprises at least one resin component.

4. The metallic paint of claim 3, wherein the at least one resin component of the film-forming agent is a resin containing an amino group.

5. The metallic paint of claim 4, wherein the resin is a melamine resin.

6. The metallic paint of claim 1, wherein the ratio of weight fractions of aluminum effect pigment to film-forming agent is 1:1 to 1:30.

7. The metallic paint of claim 6, wherein the weight fraction of aluminum effect pigment to film-forming agent ranges from 1:3 to 1:20.

8. The metallic paint of claim 7, wherein the weight fraction of aluminum effect pigment to film-forming agent ranges from 1:4 to 1:15.

9. The metallic paint of claim 1, wherein the metallic paint has a solvent content of 5% to 85% by weight, based on the total weight of the paint.

10. The metallic paint of claim 1, wherein the metallic paint has a water content of 5% to 85% by weight, based on the total weight of the paint.

11. The metallic paint of claim 1, wherein the metallic paint has a 5% to 40% by weight solids content, based on the total weight of the paint.

12. The metallic paint of claim 1, wherein the at least one organofunctional silane comprises an epoxysilane or consists of an epoxysilane.

13. The metallic paint of claim 12, wherein the at least one epoxysilane is a compound of the general formula (IV):

$$R^1_a R^2_b SiX_{(4-a-b)} \quad (IV)$$

where $R^1$ is a nonhydrolyzable radical, $R^2$ is a nonhydrolyzable radical which carries at least one epoxy group, and X stands for radicals which are alike or different from one another and are selected from hydroxyl group and hydrolyzable substitution products of a hydroxyl group, with a having an integral value from 0 to 3 and b having an integral value[s] from 1 to 3, and a and b together having a value of 1, 2 or 3, or an Si—O—Si bridged oligomeric or polymeric epoxysilicone derived from the compound of formula (IV).

14. The metallic paint of claim 1, wherein the leafing aluminum effect pigments are prepared by at least one of mechanical milling and shaping of aluminum particles using at least one organic lubricant.

15. The metallic paint of claim 14, wherein the leafing aluminum effect pigments have a $d_{90}$ of 25 to 50 μm.

16. The metallic paint of claim 14, wherein the leafing aluminum effect pigments have an average thickness of more than 80 to 150 nm.

17. The metallic paint of claim 14, wherein the organic lubricant is stearic acid.

18. The metallic paint of claim 1, wherein the leafing aluminum effect pigments have a $d_{50}$ of 11 to 35 μm.

19. The metallic paint of claim 1, wherein the leafing aluminum effect pigments have a $d_{50}$ of 2 to 25 μm.

20. The metallic paint of claim 19, wherein the leafing aluminum effect pigments have a $d_{90}$ of 8 to 40 μm.

21. The metallic paint of claim 19, wherein the leafing aluminum effect pigments have an average thickness of 15 to 100 nm.

22. The metallic paint of claim 19, wherein the leafing aluminum effect pigments have a relative breadth of the thickness distribution Δh, which is calculated from the corresponding cumulative undersize curve of the relative frequencies in accordance with the formula $\Delta h = 100 \times (h_{90} - h_{10})/h_{50}$, of 30% to less than 70%.

23. The metallic paint of claim 1, wherein the leafing aluminum pigments have a shape factor of 80 to 400.

24. The metallic paint of claim 1, wherein the leafing aluminum effect pigments have a roughness value of 0.5 to 1.0.

25. The metallic paint of claim 1, wherein following application to a substrate and drying, said paint forms a high-gloss, unstructured, metallic coating.

26. The metallic paint of claim 1, wherein the paint further comprises at least one additive selected from the group consisting of fillers, reactive diluents, UV absorbers, light stabilizers, free-radical scavengers, photoinitiators or coinitiators, crosslinking agents, deaerating agents, slip additives, inhibitors, defoaming agents, emulsifiers, wetting and dispersing agents, adhesion promoters, flow control agents, film-forming auxiliaries, thickeners, flame retardants, siccatives, dryers, antiskinning agents, corrosion inhibitors, anticorrosion pigments, waxes and combinations of these additives.

27. A process for preparing metallic paint according to claim 1, which comprises: combining leafing aluminum effect pigments, at least one organofunctional silane, and at least one film-forming binder.

28. The process of claim 17, wherein the leafing aluminum effect pigments are prepared by at least one of mechanical milling and mechanical shaping of aluminum particles using at least one organic lubricant.

29. The process of claim 28, wherein the organic lubricant is stearic acid.

30. A method of forming a high-gloss coating with a pronounced metallic effect wherein the method comprises incorporating into said coating a metallic paint according to claim 1.

31. The method of claim 30, wherein the high gloss coating with a pronounced metallic effect is selected from the group consisting of an automobile finish, an automobile refinish, an industrial coating and coatings on metal, plastics, wood and glass.

32. A painted article wherein the painted article is painted with a metallic paint of claim 1.

33. A vehicle finish, comprising a metallic paint according to claim 1.

* * * * *